United States Patent
Zhang et al.

(10) Patent No.: US 10,181,205 B2
(45) Date of Patent: Jan. 15, 2019

(54) IMAGE PROCESSING METHOD AND IMAGE PROCESSING APPARATUS

(71) Applicant: Novatek Microelectronics Corp., Hsinchu (TW)

(72) Inventors: Lei Zhang, ShanXi Province (CN); Yuan-Jia Du, Shandong Province (CN); Heng-Yao Lin, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 93 days.

(21) Appl. No.: 15/591,121

(22) Filed: May 10, 2017

(65) Prior Publication Data

US 2018/0330523 A1     Nov. 15, 2018

(51) Int. Cl.
*G06T 11/00* (2006.01)
*G09G 5/02* (2006.01)

(52) U.S. Cl.
CPC .............. *G06T 11/001* (2013.01); *G09G 5/02* (2013.01)

(58) Field of Classification Search
None
See application file for complete search history.

(56) References Cited

U.S. PATENT DOCUMENTS

| | | | |
|---|---|---|---|
| 6,625,326 B1* | 9/2003 | Cho | G06T 5/20 348/625 |
| 2011/0057950 A1* | 3/2011 | Kim | G09G 5/02 345/602 |
| 2011/0222770 A1* | 9/2011 | Au | G06T 3/4023 382/173 |
| 2011/0254847 A1* | 10/2011 | Au | G06T 3/4023 345/428 |
| 2015/0254815 A1* | 9/2015 | Lin | G06T 11/001 382/299 |

* cited by examiner

*Primary Examiner* — Ryan M Gray
(74) *Attorney, Agent, or Firm* — JCIPRNET

(57) ABSTRACT

An image processing apparatus including an image processing circuit is provided. The image processing circuit is configured to perform a subpixel conversion operation on an input image of a first format to convert the input image of the first format to the input image of a second format; obtain a first detection result with respect to a target pixel of the input image of the first format; determine a filter parameter with respect to the target pixel according to the first detection result; and perform a subpixel rendering operation on the input image of the second format according to the determined filter parameter to obtain an output image.

14 Claims, 3 Drawing Sheets

| N_00 | N_01 | N_02 |
|------|------|------|
| N_10 | T_C  | N_12 |
| N_20 | N_21 | N_22 |

FIG. 2

| 0 | 1 | 0 |
|---|---|---|
| 1 | 0 | 1 |
| 0 | 1 | 0 |

FIG. 3

IMAGE PROCESSING METHOD AND IMAGE PROCESSING APPARATUS

BACKGROUND OF THE INVENTION

1. Field of the Invention

The invention generally relates to an image processing method and an image processing apparatus, in particular, to an image processing method in multi-primary color (MPC) display and an image processing apparatus using the same.

2. Description of Related Art

With the blooming development in display technology, the market demands for performance requirements of subpixel rendering (SPR) are advancements in high resolution, high brightness and low-power consumption. However, with increases in resolution of the display panel, because the amount of subpixels on the display panel also increases in order to display in high resolution, manufacturing cost is also increased accordingly. In order to increase the transmittance of the display panel, a subpixel rendering method has been developed. A display apparatus generally uses different subpixel arrangements and formulates a proper SPR algorithm so that the resolution may be increased. Further, from the perspective of display quality, a proper image processing method is necessary based on requirements in practical applications. In the related art, the subpixel rendering operation often damages many color details. A more preferable user experience may be provided if the display apparatus is capable of continuously providing a favorable display quality.

SUMMARY OF THE INVENTION

Accordingly, the invention is directed to an image processing method and an image processing apparatus capable of keeping color details well.

An embodiment of the invention provides an image processing method including: performing a subpixel conversion operation on an input image of a first format to convert the input image of the first format to the input image of a second format; obtaining a first detection result with respect to a target pixel of the input image of the first format; determining a filter parameter with respect to the target pixel according to the first detection result; and performing a subpixel rendering operation on the input image of the second format according to the determined filter parameter to obtain an output image. The first detection result is the maximum of a plurality of color differences. Each of the color differences is the maximum of a plurality of absolute differences. Each of the absolute differences is an absolute difference between a graylevel difference of any two of three subpixels of the target pixel and a graylevel difference of two of three subpixels of a respective neighbor pixel neighboring to the target pixel, which are of colors same as the said two subpixels of the target pixel.

In an embodiment of the invention, the image processing method further including: obtaining a second detection result with respect to the target pixel. The second detection result is the maximum of a plurality of minimum component differences with respect to neighbor pixels neighboring to the target pixel. Each of the minimum component differences is an absolute difference between the minimum graylevel of the three subpixels of the target pixel and the minimum graylevel of the three subpixels of the respective neighbor pixel. The step of determining the filter parameter with respect to the target pixel according to the first detection result comprises determining the filter parameter with respect to the target pixel according to the first detection result and the second detection result.

In an embodiment of the invention, the step of determining the filter parameter with respect to the target pixel according to the first detection result and the second detection result further includes: blending the first detection result and the second detection result according to a weight setting signal; and determining the filter parameter according to a blending result of the first detection result and the second detection result.

In an embodiment of the invention, the neighbor pixels associated with the second detection result include eight pixels including left, right, upper, lower, upper-left, upper-right, lower-left, and lower-right pixels neighboring to the target pixel.

In an embodiment of the invention, when the second detection result is larger, the filter parameter determined according to the second detection result is corresponding to a sharper filter to be applied to pixel data of the target pixel.

In an embodiment of the invention, the neighbor pixels associated with the first detection result include four pixels including left, right, upper and lower pixels neighboring to the target pixel.

In an embodiment of the invention, when the first detection result is larger, the filter parameter determined according to the first detection result is corresponding to a smoother filter to be applied to pixel data of the target pixel.

An embodiment of the invention provides an image processing apparatus including: an image processing circuit configured to perform a subpixel conversion operation on an input image of a first format to convert the input image of the first format to the input image of a second format; obtain a first detection result with respect to a target pixel of the input image of the first format; determine a filter parameter with respect to the target pixel according to the first detection result; and perform a subpixel rendering operation on the input image of the second format according to the determined filter parameter to obtain an output image. The first detection result is the maximum of a plurality of color differences. Each of the color differences is the maximum of a plurality of absolute differences. Each of the absolute differences is an absolute difference between a graylevel difference of any two of three subpixels of the target pixel and a graylevel difference of two of three subpixels of a respective neighbor pixel neighboring to the target pixel, which are of colors same as the said two subpixels of the target pixel.

In an embodiment of the invention, the image processing circuit is further configured to obtain a second detection result with respect to the target pixel. The second detection result is the maximum of a plurality of minimum component differences with respect to neighbor pixels neighboring to the target pixel. Each of the minimum component differences is an absolute difference between the minimum graylevel of the three subpixels of the target pixel and the minimum graylevel of the three subpixels of the respective neighbor pixel. The image processing circuit determines the filter parameter with respect to the target pixel according to the first detection result and the second detection result.

In an embodiment of the invention, when the image processing circuit determines the filter parameter with respect to the target pixel according to the first detection result and the second detection result, the image processing circuit is further configured to: blend the first detection result and the second detection result according to a weight setting signal; and determine the filter parameter according to a blending result of the first detection result and the second detection result.

In an embodiment of the invention, the neighbor pixels associated with the second detection result include eight pixels including left, right, upper, lower, upper-left, upper-right, lower-left, and lower-right pixels neighboring to the target pixel.

In an embodiment of the invention, when the second detection result is larger, the filter parameter determined according to the second detection result is corresponding to a sharper filter to be applied to pixel data of the target pixel.

In an embodiment of the invention, the neighbor pixels associated with the first detection result include four pixels including left, right, upper and lower pixels neighboring to the target pixel.

In an embodiment of the invention, when the first detection result is larger, the filter parameter determined according to the first detection result is corresponding to a smoother filter to be applied to pixel data of the target pixel.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 illustrates a schematic diagram of the target pixel and neighbor pixels thereof according to an embodiment of the invention.

FIG. 3 illustrates a schematic diagram of a mask to obtain differences in horizontal and vertical directions according to the embodiment depicted in FIG. 2.

DESCRIPTION OF THE EMBODIMENTS

Figure 1:
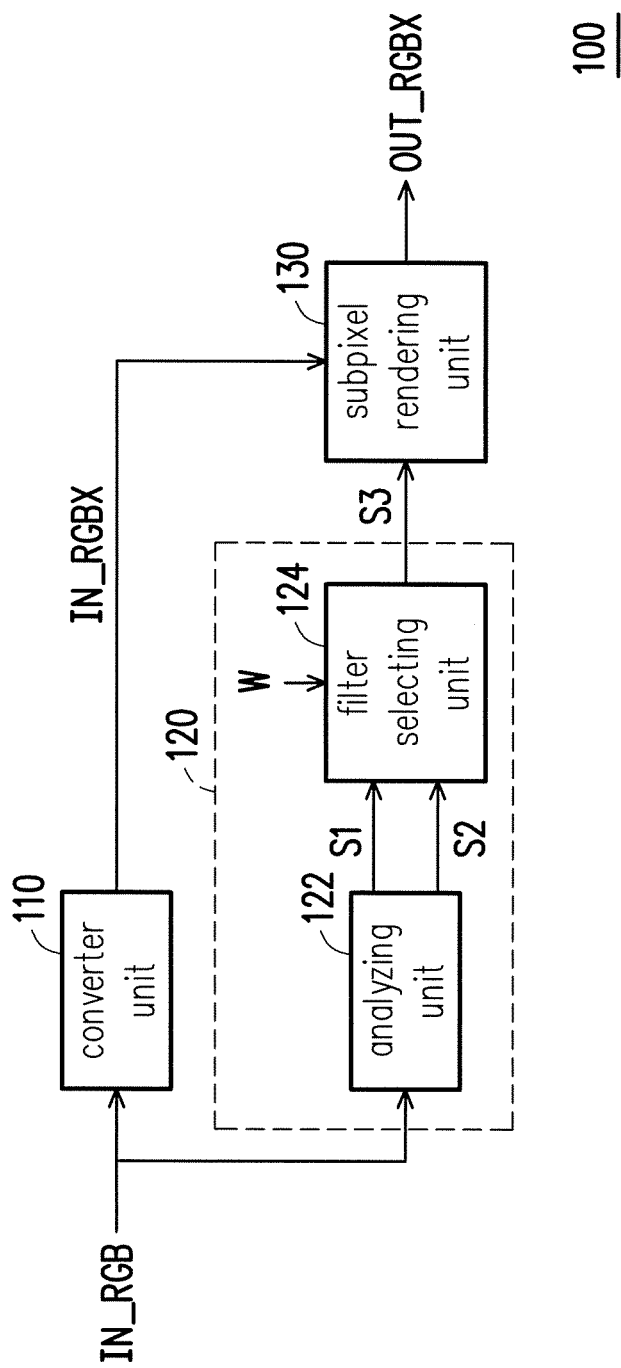
FIG. 1 illustrates a block diagram of an image processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The following will describe some embodiments as examples of the invention. However, it should be noted that the invention is not limited to the disclosed embodiments. Moreover, some embodiments may be combined where appropriate. The term "couple" used throughout this specification (including the claims) may refer to any direct or indirect connection means. For example, if it is described that the first device is coupled to the second device, it should be understood that the first device may be directly connected to the second device or indirectly connected to the second device through other devices or certain connection means. In addition, the term "signal" may stand for at least one current, voltage, electric charge, temperature, data, electromagnetic wave, or any other signal or signals.

FIG. 1 illustrates a block diagram of an image processing apparatus according to an embodiment of the invention. Referring to FIG. 1, the image processing apparatus 100 of the present embodiment includes a converter unit 110, a detector unit 120 and a subpixel rendering (SPR) unit 130, where the detector unit 120 includes an analyzing unit 122 and a filter selecting unit 124. In the present embodiment, the detector unit 120 analyzes an input image IN_RGB to obtain at least one detection result. The SPR unit 130 performs the subpixel rendering operation by using a filter selected based on the determined filter parameters. In the subpixel rendering operation, every pixel shares its subpixels to its neighbor pixels through the selected filter. In an embodiment, the smoother the filter selected for pixel data of a target pixel, the more sharing the target pixel is to its neighbor pixels. The selected filter is regarded as a smoother filter if it make the pixel data of the target pixel be more sharing to its neighbor pixels, and the selected filter is regarded as a sharper filter if it make the pixel data of the target pixel be less sharing to its neighbor pixels. Subpixel rendering operation is done in a manner of subpixel by subpixel. The color detail performance is improved in the subpixel rendering operation.

To be specific, FIG. 2 illustrates a schematic diagram of the target pixel and neighbor pixels thereof according to an embodiment of the invention. A target pixel T_C may be regarded as the center pixel of a 3×3 pixel block wherein a row index is denoted from 0 to 2 and a column index is denoted from 0 to 2, and pixels in the 3×3 pixel block except the target pixel are neighbor pixels. FIG. 3 illustrates a schematic diagram of a mask to obtain differences in horizontal and vertical directions according to the embodiment depicted in FIG. 2. Referring to FIG. 1 to FIG. 3, the converter unit 110 receives the input image IN_RGB of a RGB format, where the RGB format indicates that each pixel data of the input image IN_RGB includes subpixel data (i.e., graylevel values) of red, green and blue colors. The converter unit 110 converts the input image IN_RGB of the RGB format into an input image IN_RGBX of a RGBX format and outputs the input image IN_RGBX to the detector unit 120 and to the SPR unit 130 for the subpixel sharing operation. In the present embodiment, the RGBX format indicates that each pixel data of the input image IN_RGBX includes subpixel data of red, green, blue, and white colors, for example. In another embodiment, the X color may be a yellow color, a cyan color or a green color, and the invention is not limited thereto.

The analyzing unit 122 receives and analyzes the input image IN_RGB. For example, the analyzing unit 122 may analyze image content characteristic to obtain at least one detection result. In an embodiment, the image content characteristic may include the image graylevel, the image resolution, the image brightness, the image spectral distribution, the image discrepancy, the image relevancy. In the present embodiment, two detection results S1 and S2 are taken as an example for description, and the invention is not limited thereto.

In the present embodiment, the analyzing unit 122 analyzes the input image IN_RGB to obtain a first detection result S with respect to the target pixel T_C. The analyzing unit 122 calculates the color differences between the target pixel T_C and respective eight neighbor pixels N_00, N_01, N_02, N_10, N_12, N_20, N_21, and N_22 in a 3×3 pixel block as illustrated in FIG. 2. In the present embodiment, the neighbor pixels N_01, N_21, N_10 and N_12 associated with the first detection result include four pixels including left, right, upper and lower pixels neighboring to the target pixel T_C. The analyzing unit 122 applies the mask depicted in FIG. 3 to the calculated color difference between the target pixel T_C and the eight neighbor pixels to obtain the color differences in the horizontal and vertical directions, including a color difference diff_01 between the target pixel T_C and the neighbor pixel N_01 and a color difference diff_21 between the target pixel T_C and the neighbor pixel N_21 in the vertical direction, and a color difference diff_10 between the target pixel T_C and the neighbor pixel N_10 and a color difference diff_12 between the target pixel T_C and the neighbor pixel N_12 in the horizontal direction. The analyzing unit 122 selects the maximum of the color differences diff_01, diff_21, diff_10 and diff_12 to serve as the first detection result S1. It should be noted that the mask depicted in FIG. 3 is not a limitation but an example, and in another embodiment of the present invention, a difference mask, such as leading to include all eight color differences, may be used.

In the present embodiment, each of the color differences diff_01, diff_21, diff_10 and diff_12 is the maximum of a plurality of absolute differences. Each of the absolute differences is an absolute difference between a graylevel difference of any two of three subpixels of the target pixel T_C and a graylevel difference of two of three subpixels, which are of same colors as the said two subpixels of the target pixel, of a respective neighbor pixel neighboring to the target pixel. That is to say, each of the color differences is calculated based on the following formula: MAX [$|(R_{mn}-G_{mn})-(R_{11}-G_{11})|$, $|(G_{mn}-B_{mn})-(G_{11}-B_{11})|$, $|(R_{mn}-B_{mn})-(R_{11}-B_{11})|$], where ($R_{11}$, $G_{11}$, $B_{11}$) indicates graylevel values of RGB subpixels of the target pixel as the center pixel of a 3×3 pixel block, and ($R_{mn}$, $G_{mn}$, $B_{mn}$) indicates graylevel values of RGB subpixels of a neighbor pixel in the 3×3 pixel block. For example, ($R_{01}$, $G_{01}$, $B_{01}$) denotes graylevel values of RGB subpixels of the neighbor pixel N_01, and the color difference between the target pixel T_C and the neighbor pixel N_01, denoted by diff_01, may be the maximum of three absolute differences as $|(R_{01}-G_{01})-(R_{11}-G_{11})|$, $|(G_{101}-B_{01})-(G_{11}-B_{11})|$, and $|(R_{01}-B_{01})-(R_{11}-B_{11})|$.

For example, if the target pixel T_C displays white, graylevel values ($R_{11}$, $G_{11}$, $B_{11}$) may be expressed in (255, 255, 255) as in 24-bits RGB color, and if the neighbor pixel N_01 displays yellow, graylevel values ($R_{01}$, $G_{01}$, $B_{01}$) may be expressed in (255, 255, 0). The color difference diff_01 is MAX [|(255-255)-(255-255)|, |(255-255)-(255-0)|, |(255-255)-(255-0)|], i.e. diff_01=255. The other color differences diff_21, diff_10 and diff_12 may be deduced by analogy. The detector unit 120 selects the maximum of the color differences diff_01, diff_21, diff_10 and diff_12 to serve as the first detection result S1. The first detection result S1 may influence filter selection of the filtering selecting unit 124 and thereby influence the subpixel rendering operation of the SPR unit 130. The larger the maximum color difference is, the smoother filter the subpixel rendering operation may apply to the pixel data of the target pixel T_C.

In the present embodiment, the analyzing unit 122 also analyzes the input image IN_RGB to obtain a second detection result S2 with respect to the target pixel T_C. The second detection result S2 is the maximum of a plurality of minimum component differences with respect to the neighbor pixels N_00 to N_22 neighboring to the target pixel T_C. The neighbor pixels N_00 to N_22 associated with the second detection result S2 include eight pixels including left, right, upper, lower, upper-left, upper-right, lower-left, and lower-right pixels neighboring to the target pixel in the 3×3 pixel block as illustrated in FIG. 2. Each of the minimum component differences is an absolute difference between the minimum graylevel values of the three subpixels of the target pixel and the minimum graylevel values of the three subpixels of the respective neighbor pixel. It is noted that when a minimum component difference between the target pixel and a neighbor pixel is large, one of the following two cases may be true to represent the target pixel and the neighbor pixel: (1) one pixel has high and equal graylevel values of RGB colors (e.g., (R,G,B)=(255,255, 255)) and the other pixel has a high saturation value; and (2) one pixel has high and equal graylevel values of RGB colors and the other pixel has low and equal graylevel values of RGB colors. In the present embodiment, the image sharpness may be maintained when any one of the above two cases exists. The saturation value with respect to the pixel may be calculated as 1−[min(R, G, B)/max(R, G, B)], where min(R, G, B) denotes the minimum graylevel value among three graylevel values of RGB subpixels, and max(R, G, B) denotes the maximum graylevel value. For example, if a large difference is between the maximum graylevel and the minimum graylevel, among the three graylevel values of RGB subpixels, the pixel may have a high saturation value.

In the present embodiment, Min_comp (11) denotes the minimum graylevel value of subpixels of the target pixel T_C, min($R_{11}$, $G_{11}$, $B_{11}$), and Min_comp (00) denotes the minimum graylevel value of subpixels of the neighbor pixel N_00, min($R_{00}$, $G_{00}$, $B_{00}$). Equivalent expressions are Min_comp (11)=min($R_{11}$, $G_{11}$, $B_{11}$) and Min_comp (00)=min ($R_{00}$, $G_{00}$, $B_{00}$). The minimum component difference between Min_comp (11) and Min_comp (00), denoted by Diff_min (00), is calculated to be the absolute value of the difference between Min_comp(00) and Min_comp(11), which is expressed as Diff_min (00)=|Min_comp(00)−Min_comp(11)|. The other minimum component differences, i.e. Diff_min (01), Diff_min (02), Diff_min (10), Diff_min (12), Diff_min (20), Diff_min (21) and Diff_min (22) can be deduced by analogy. The analyzing unit 122 selects the maximum of the minimum component differences Diff_min (00), Diff_min (01), Diff_min (02), Diff_min (10), Diff_min (12), Diff_min (20), Diff_min (21) and Diff_min (22) to serve as the second detection result S2. The larger the maximum of the minimum component differences Diff_min (00), Diff_min (01), Diff_min (02), Diff_min (10), Diff_min (12), Diff_min (20), Diff_min (21) and Diff_min (22) is, the sharper filter the subpixel rendering operation may apply to the pixel data of the target pixel T_C.

The first detection result S1 and the second detection result S2 are outputted to the filter selecting unit 124. The filter selecting unit 124 blends the first detection result S1 and the second detection result S2 according to a weight setting signal W. In the present embodiment, the weight setting signal W includes a weight parameter ω, and the blending result is expressed in ωS1+(1−ω)S2, where ω is larger than or equal to 0 and smaller than or equal to 1. In the present embodiment, the filter selecting unit 124 may include a plurality of arithmetic operation circuit such as adders and/or multipliers to perform the blending operation.

The filter selecting unit 124 determines the filter parameter S3 according to the blending result ωS1+(1−ω)S2 of the first detection result S1 and the second detection result S2, and outputs the determined filter parameter S3 to the SPR unit 130. For the case of ω=1, the filter selecting unit 124 determines the filter parameter S3 simply according to the first detection result S1. For the case of 0<ω<1, the filter selecting unit 124 determines the filter parameter S3 according to the first detection result S1 and the second detection result S2. For the case of ω=0, the filter selecting unit 124 determines the filter parameter S3 simply according to the second detection result S2. In some cases, such as color detail performance of visually bright color (e.g., yellow) foreground words with high graylevel background may be ignored, or, the input image IN_RGB does not include bright color foreground words with high graylevel background, the first detection result S1 may be given more weighting than the second detection result S2; and, on the other hand, when color detail performance of visually bright color foreground words with high graylevel background is critical, the weighting value (1−ω) for the second detection result S2 may be configured to be larger. In the present embodiment, when the first detection result S1 (as the maximum of a plurality of color differences, such as diff_01, diff_21, diff_10 and diff_12) is a larger value, the filter parameter S3 is corresponding to a smoother filter to be applied to the pixel data of the target pixel T_C. When the second detection result S2 (as the maximum of a plurality of minimum component differences Diff_min (00), Diff_min (01), Diff_min (02), Diff_min (10), Diff_min (12), Diff_min (20), Diff_min (21) and Diff_min (22)) is a larger value, the filter parameter S3 is corresponding to a sharper filter to be applied to the pixel data of the target pixel T_C.

The determined filter parameter S3 is outputted to the SPR unit 130. In the present embodiment, the determined filter parameter S3 may be a filter index according to which the SPR unit 130 may be able to select a corresponding filter from a lookup table and use the selected filter for subpixel rendering operation. The selected filter may be a poly-phase filter. The SPR unit 130 performs the subpixel rendering operation on the input image IN_RGBX of the second format to obtain an output image OUT_RGBX. After the subpixel rendering operation, the output image OUT_RGBX is outputted to drive a display panel. Every pixel shares its subpixels to its neighbor pixels through the selected filter. The smoother the filter selected for performing subpixel rendering operation on the pixel data of a target pixel, the more sharing the target pixel is to its neighbor pixels. Subpixel rendering operation is done in a manner of subpixel by subpixel. The color detail performance is improved in the subpixel rendering operation.

In an embodiment, the converter unit 110, the detector unit 120, and the SPR unit 130 depicted in FIG. 1 may be implemented as one or more circuits. The circuit structure thereof may be implemented by using any suitable circuit in the related art, which are not particularly limited by the invention. Therefore, enough teaching, suggestion, and implementation illustration for internal structures and implementations of the converter unit 110, the detector unit 120, and the SPR unit 130 depicted in FIG. 1 may be obtained with reference to common knowledge in the related art, which are not repeated hereinafter.

Alternatively, the converter unit 110, the detector unit 120, and the SPR unit 130 depicted in FIG. 1 may also be implemented as a plurality of program codes. These program codes will be stored in one memory, so that these program codes may be executed by a processor unit including, for example, Central Processing Unit (CPU), Microprocessor, Digital Signal Processor (DSP), Programmable Controller, Programmable Logic Device (PLD), or other similar devices, a combination of the said devices, which are not particularly limited by the invention. The invention is not intended to limit whether the converter unit 110, the detector unit 120, and the SPR unit 130 depicted in FIG. 1 is implemented by ways of software or hardware.

Figure 4:
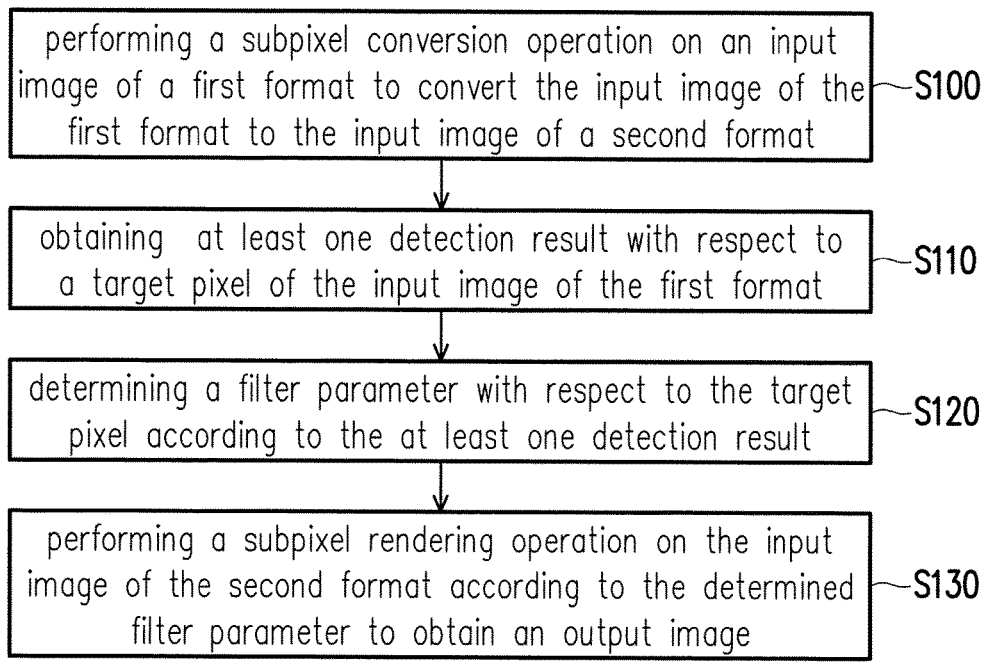
FIG. 4 is a flowchart illustrating an image processing method according to an embodiment of the invention.

FIG. 4 is a flowchart illustrating an image processing method according to an embodiment of the invention. Referring to FIG. 1 and FIG. 4, the image processing method of the present embodiment is at least adapted to the image processing apparatus 100 depicted in FIG. 1, but the invention is not limited thereto. Taking the image processing apparatus 100 depicted in FIG. 1 for example, in step S100, the image processing apparatus 100 performs the subpixel conversion operation on the input image IN_RGB of the first format to convert the input image IN_RGB of the first format to the input image IN_RGBX of the second format. In step S110, the image processing apparatus 100 obtains at least one detection result with respect to the target pixel T_C of the input image IN_RGB of the first format. In step S120, the image processing apparatus 100 determines the filter parameter with respect to the target pixel T_C according to the at least one detection result. In step S130, the image processing apparatus 100 performs the subpixel rendering operation on the input image IN_RGBX of the second format according to the determined filter parameter to obtain an output image OUT_RGBX. The image processing method described in the present embodiment is sufficiently taught, suggested, and embodied in the embodiments illustrated in FIG. 1 to FIG. 3, and therefore no further description is provided herein.

In summary, in exemplary embodiments of the invention, the image processing method is provided to keep color details well and applicable to subpixel rendering operation based on the determined filter parameter. The input image is analyzed to obtain at least one detection result with respect to the target pixel. The filter parameter with respect to the target pixel is determined according to the at least one detection result. The larger the first detection result is, the smoother filter the subpixel rendering operation may apply to the pixel data of the target pixel. The larger the second detection result is, the sharper filter the subpixel rendering operation may apply to the pixel data of the target pixel. Every pixel shares its subpixels to its neighbor pixels through the selected filter. The smoother the filter selected for subpixel rendering operation performed on the pixel data of the target pixel, the more sharing the target pixel is to its neighbor pixels. Subpixel rendering operation is done in a manner of subpixel by subpixel. The color detail performance is improved in the subpixel rendering operation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing method comprising:
performing a subpixel conversion operation on an input image of a first format to convert the input image of the first format to the input image of a second format;
obtaining a first detection result with respect to a target pixel of the input image of the first format;
determining a filter parameter with respect to the target pixel according to the first detection result; and
performing a subpixel rendering operation on the input image of the second format according to the determined filter parameter to obtain an output image,
wherein the first detection result is the maximum of a plurality of color differences, each of the color differences is the maximum of a plurality of absolute differences, each of the absolute differences is an absolute difference between a graylevel difference of any two of three subpixels of the target pixel and a graylevel difference of two of three subpixels, which are of colors same as the said two subpixels of the target pixel, of a respective neighbor pixel neighboring to the target pixel.

2. The image processing method according to claim 1, further comprising:
obtaining a second detection result with respect to the target pixel,
wherein the second detection result is the maximum of a plurality of minimum component differences with respect to neighbor pixels neighboring to the target pixel, each of the minimum component differences is an absolute difference between the minimum graylevel of the three subpixels of the target pixel and the minimum graylevel of the three subpixels of the respective neighbor pixel, and
wherein the step of determining the filter parameter with respect to the target pixel according to the first detection result comprises determining the filter parameter with respect to the target pixel according to the first detection result and the second detection result.

3. The image processing method according to claim 2, wherein the step of determining the filter parameter with respect to the target pixel according to the first detection result and the second detection result further comprises:
blending the first detection result and the second detection result according to a weight setting signal; and
determining the filter parameter according to a blending result of the first detection result and the second detection result.

4. The image processing method according to claim 2, wherein the neighbor pixels associated with the second detection result comprise eight pixels including left, right, upper, lower, upper-left, upper-right, lower-left, and lower-right pixels neighboring to the target pixel.

5. The image processing method according to claim 2, wherein when the second detection result is larger, the filter parameter determined according to the second detection result is corresponding to a sharper filter to be applied to pixel data of the target pixel.

6. The image processing method according to claim 1, wherein the neighbor pixels associated with the first detection result comprise four pixels including left, right, upper and lower pixels neighboring to the target pixel.

7. The image processing method according to claim 1, wherein when the first detection result is larger, the filter parameter determined according to the first detection result is corresponding to a smoother filter to be applied to pixel data of the target pixel.

8. An image processing apparatus comprising:
an image processing circuit configured to perform a subpixel conversion operation on an input image of a first format to convert the input image of the first format to the input image of a second format; obtain a first detection result with respect to a target pixel of the input image of the first format; determine a filter parameter with respect to the target pixel according to the first detection result; and perform a subpixel rendering operation on the input image of the second format according to the determined filter parameter to obtain an output image,
wherein the first detection result is the maximum of a plurality of color differences, each of the color differences is the maximum of a plurality of absolute differences, each of the absolute differences is an absolute difference between a graylevel difference of any two of three subpixels of the target pixel and a graylevel difference of two of three subpixels, which are of colors same as the said two subpixels of the target pixel, of a respective neighbor pixel neighboring to the target pixel.

9. The image processing apparatus according to claim 8, wherein the image processing circuit is further configured to obtain a second detection result with respect to the target pixel,
wherein the second detection result is the maximum of a plurality of minimum component differences with respect to neighbor pixels neighboring to the target pixel, each of the minimum component differences is an absolute difference between the minimum graylevel of the three subpixels of the target pixel and the minimum graylevel of the three subpixels of the respective neighbor pixel, and
wherein the image processing circuit determines the filter parameter with respect to the target pixel according to the first detection result and the second detection result.

10. The image processing apparatus according to claim 9, wherein when the image processing circuit determines the filter parameter with respect to the target pixel according to the first detection result and the second detection result, the image processing circuit is further configured to: blend the first detection result and the second detection result according to a weight setting signal; and determine the filter parameter according to a blending result of the first detection result and the second detection result.

11. The image processing apparatus according to claim 9, wherein the neighbor pixels associated with the second detection result comprise eight pixels including left, right, upper, lower, upper-left, upper-right, lower-left, and lower-right pixels neighboring to the target pixel.

12. The image processing apparatus according to claim 9, wherein when the second detection result is larger, the filter parameter determined according to the second detection result is corresponding to a sharper filter to be applied to pixel data of the target pixel.

13. The image processing apparatus according to claim 8, wherein the neighbor pixels associated with the first detection result comprise four pixels including left, right, upper and lower pixels neighboring to the target pixel.

14. The image processing apparatus according to claim 8, wherein when the first detection result is larger, the filter parameter determined according to the first detection result is corresponding to a smoother filter to be applied to pixel data of the target pixel.

* * * * *